US012565803B1

(12) United States Patent
Levi

(10) Patent No.: US 12,565,803 B1
(45) Date of Patent: Mar. 3, 2026

(54) ZERO SIGHT LINE DOOR AND WINDOW

(71) Applicant: Jonathan Levi, Boston, MA (US)

(72) Inventor: Jonathan Levi, Boston, MA (US)

( * ) Notice: Subject to any disclaimer, the term of this patent is extended or adjusted under 35 U.S.C. 154(b) by 0 days.

(21) Appl. No.: 19/217,534

(22) Filed: May 23, 2025

(51) Int. Cl.
*E06B 3/64* (2006.01)
*E06B 3/24* (2006.01)

(52) U.S. Cl.
CPC . *E06B 3/64* (2013.01); *E06B 3/24* (2013.01)

(58) Field of Classification Search
CPC ........ E06B 3/7005; E06B 3/64; E06B 3/5892; E06B 3/56; E06B 3/24; E06B 2003/7011; E06B 2003/7013; E06B 2003/7086
See application file for complete search history.

(56) References Cited

U.S. PATENT DOCUMENTS

D355,037 S * 1/1995 Horgan, Jr. ................. D25/48.3
5,709,055 A * 1/1998 Levi ........................ E05C 3/043 52/204.593
6,401,428 B1 * 6/2002 Glover ...................... E06B 3/24 52/786.13
6,530,184 B1 * 3/2003 Emek ........................ E06B 3/56 52/204.591
7,541,076 B2 * 6/2009 Landon .................. B82Y 30/00 428/34.4
2004/0211134 A1 * 10/2004 Glover ................ E06B 3/66366 52/204.5
2016/0290031 A1 * 10/2016 Stazi ......................... E06B 3/64
2019/0390506 A1 * 12/2019 Gagne ................... E06B 3/5409

FOREIGN PATENT DOCUMENTS

DE 29507125 U1 * 10/1995
EP 2402541 A1 * 1/2012 ........... E06B 3/5409
WO WO-2021020970 A1 * 2/2021 ........... E06B 3/5814

* cited by examiner

*Primary Examiner* — Christine T Cajilig
(74) *Attorney, Agent, or Firm* — Nutter McClennen & Fish LLP

(57) ABSTRACT

A door for a building exterior may include a glass assembly having a height and a depth and a plurality of glass lateral edges, a wood panel, the wood panel being laterally coplanar with and having a same height and depth as the glass assembly, the wood panel having a plurality of wood lateral edges, and a frame that surrounds the glass lateral edges and the wood lateral edges. The frame includes an interior-facing leg, configured to extend from one of the plurality of lateral edges toward an interior portion of the glass assembly and a lateral leg having a lateral leg thickness and orthogonally extending from an edge of the interior-facing leg and facing the lateral edges of the glass assembly and the wood panel, the frame configured so that the lateral leg thickness is the only visible part of the frame when viewed from the building exterior.

19 Claims, 14 Drawing Sheets

Section A-A (Inside View)

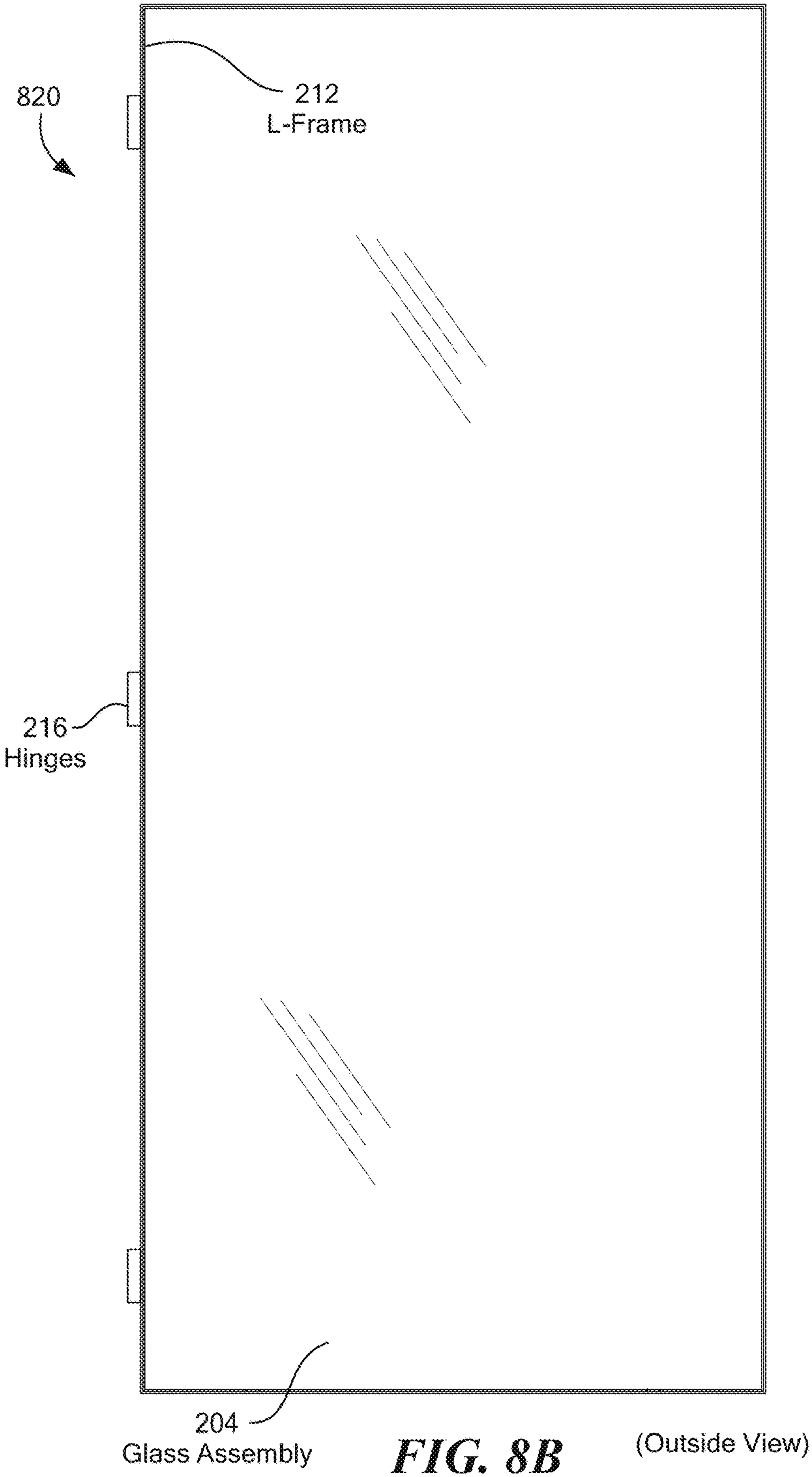
FIG. 8B (Outside View)

ZERO SIGHT LINE DOOR AND WINDOW

FIELD

Illustrative embodiments generally relate to architecture and, more particularly, various embodiments of the invention relate to construction and installation of doors and windows with minimized external frames.

BACKGROUND

Buildings typically include doors and windows to allow entry, exit, and light transmission. These features are often integrated into the building's structure during construction. When glass is used as a primary material, especially in modern architectural designs, door frames are frequently incorporated to support and secure the glass panels. Glass doors may be framed in metal or other rigid materials to ensure structural integrity and ease of installation.

SUMMARY OF VARIOUS EMBODIMENTS

In accordance with one embodiment of the invention, a door for a building exterior may include a glass assembly having a height and a depth and a plurality of glass lateral edges, a wood panel, at least a portion of the wood panel being laterally coplanar with and having a same height and depth as the glass assembly, the wood panel having a plurality of wood lateral edges, and a frame that surrounds the glass lateral edges and the wood lateral edges. The frame includes an interior-facing leg, configured to extend from one of the plurality of lateral edges toward an interior portion of the glass assembly and a lateral leg, substantially orthogonally extending from an edge of the interior-facing leg and facing the lateral edges of the glass assembly and the wood panel, the lateral leg having a lateral leg thickness. The frame, the wood panel, and the glass assembly are configured so that when the door is mounted to a building, the lateral leg thickness is the only visible part of the frame when viewed from the building exterior.

In accordance with other embodiments, the door may also include structural glazing tape having inner and outer sides, where the inner side of the structural glazing tape is affixed to an outer side of the interior-facing leg and the outer side of the structural glazing tape is affixed to an inner side of the glass assembly.

In accordance with other embodiments, the glass assembly may include a parallel plurality of glass layers, where each pair of adjacent glass layers are separated by a spacing bar at a periphery of each pair of adjacent glass layers.

In accordance with other embodiments, one or more of the plurality of glass layers is tempered glass or laminated glass.

In accordance with other embodiments, the door may also include weatherproof sealant between the frame and the glass assembly and the frame and the wood panel, configured to seal the door from moisture incursion.

In accordance with other embodiments, the weatherproof sealant may include a plurality of voids between a bottom of the glass assembly and a top of a lateral leg at a bottom of the frame.

In accordance with other embodiments, the door may also include a plurality of setting blocks between the bottom of the glass assembly and the top of the lateral leg at the bottom of the frame, where the plurality of setting blocks has a setting block height, wherein a thickness of the weatherproof sealant is equal to the setting block height.

In accordance with other embodiments, the frame is a non-metallic material.

In accordance with other embodiments, a window for a building exterior may include a glass assembly having a plurality of glass lateral edges and a frame that surrounds the glass lateral edges. The frame includes an interior-facing leg, configured to extend from one of the plurality of glass lateral edges toward an interior portion of the glass assembly and a lateral leg, substantially orthogonally extending from an edge of the interior-facing leg and facing the lateral edges of the glass assembly, the lateral leg having a lateral leg thickness. The frame and the glass assembly are configured so that when the window is mounted to a building, the lateral leg thickness is the only visible part of the frame when viewed from the building exterior.

In accordance with other embodiments, a method for assembling a door or window may include laying a frame having an L-shaped cross section, a top, and a bottom opposite the top on a horizontal surface, applying a first side of a structural glazing tape to the first leg, resting a glass assembly having a top and a bottom within the frame onto a second side of the structural glazing tape such that gaps between sides of the glass assembly and the second leg are the same, installing a plurality of setting blocks between the bottom of the frame and the bottom of the glass assembly, and applying a sealant in gaps between the first leg and a surface of the glass assembly facing the first leg, and the second leg and lateral edges of the glass assembly. The frame may include a first leg having a first leg surface in contact with the horizontal surface and a second leg having a second leg thickness substantially orthogonally extending upward from an outside edge of the first leg, the first leg surface being intended to face a building interior and the second leg thickness being intended to face outwardly from a building exterior when the door or window is mounted. The structural glazing tape is in contact with an intersection of the first and second legs.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 8B schematically shows an exterior view of a zero sight line window in accordance with illustrative embodiments of the invention.

DESCRIPTION OF ILLUSTRATIVE EMBODIMENTS

Conventional exterior doors and windows in buildings often utilize metal frames to mount the door or window within. The metal frames are typically a steel or aluminum alloy that conducts both heat and cold within the building. In some cases, both an internal and external frame is used. That is, the glass portion is mounted within an interior metal frame that fits within and opens relative to an external frame. In addition to the framed door or window being heavy and costly, the building may exhibit high heating and cooling (HVAC) costs due to thermal conduction from the exterior to the interior.

A "zero sightline" door, or sometimes referred to as a "phantom door" or "ghost door," refers to a type of door or window that minimizes the visibility of the frame, maximizing the amount of glass and offering a seamless, minimalist aesthetic. These doors are designed to blend into a wall or building structure, creating a sleek and modern appearance.

Illustrative embodiments relate to zero sight line windows and doors with a lightweight composite frame having minimal outside visible structure. Additionally, the frame preferably presents only a small border from the interior of the building. Details of the embodiments are discussed below.

Figure 1:
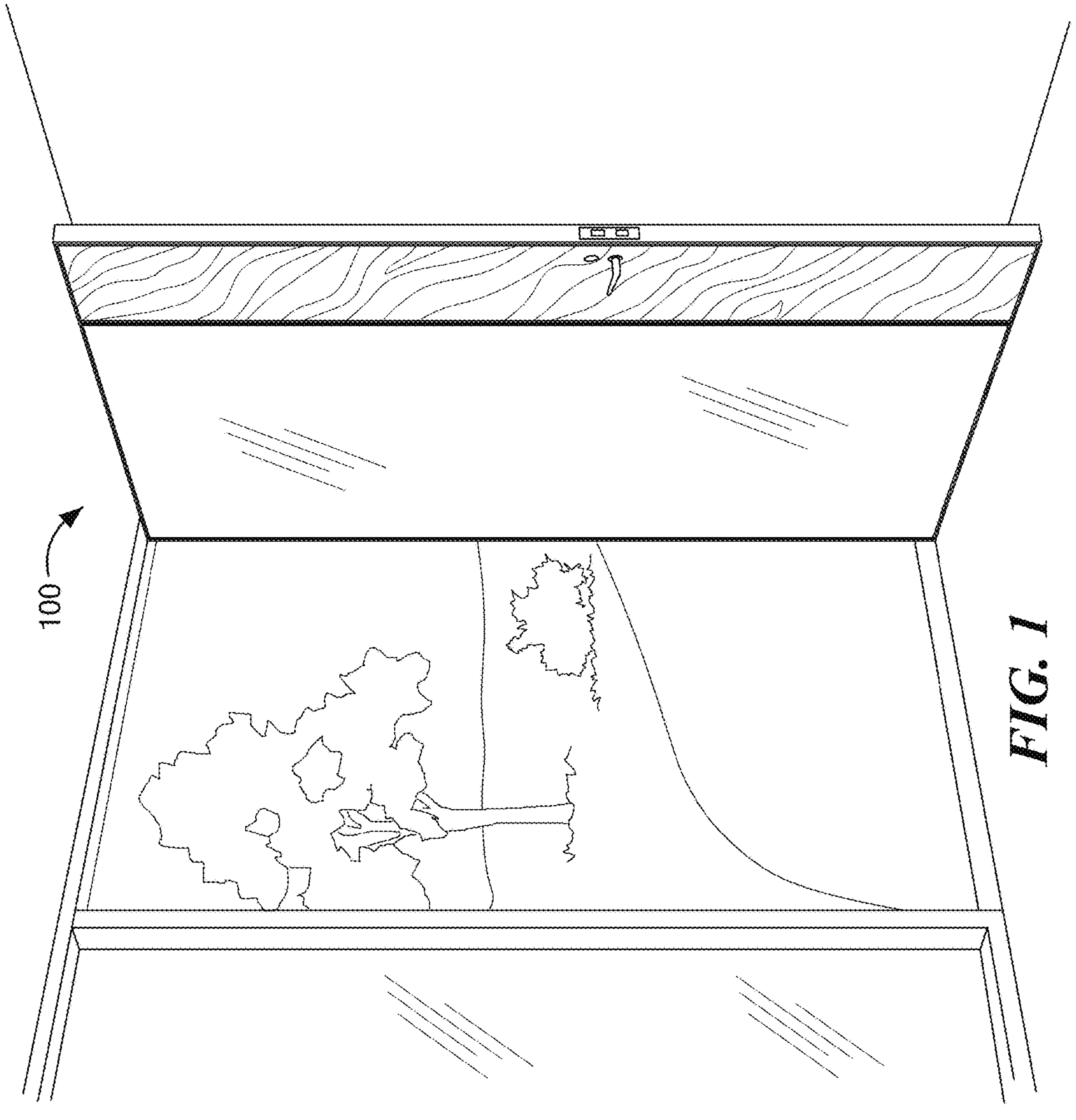
FIG. 1 schematically shows a view of the exterior face an open zero sight line door in accordance with illustrative embodiments of the invention.

FIG. 1 schematically shows a view of the exterior face an open zero sight line door 100 in accordance with illustrative embodiments of the invention. That is, the view is from a building interior to the exterior, with the exterior side of the door 100 visible.

The zero sight line door 100 provides a large glass area for improved viewing, aesthetics, and increased durability, along with a wooden panel to support door mounting hardware. The horizontal proportion of glass area to wood area may be variable and in the illustrated embodiment of FIG. 1 the glass area is approximately 75-80% of the width while the wood panel occupies approximately 20-25% of the width. Any exterior door dimensions and thickness may be used, including 1¾" thick exterior doors.

Figure 2A:
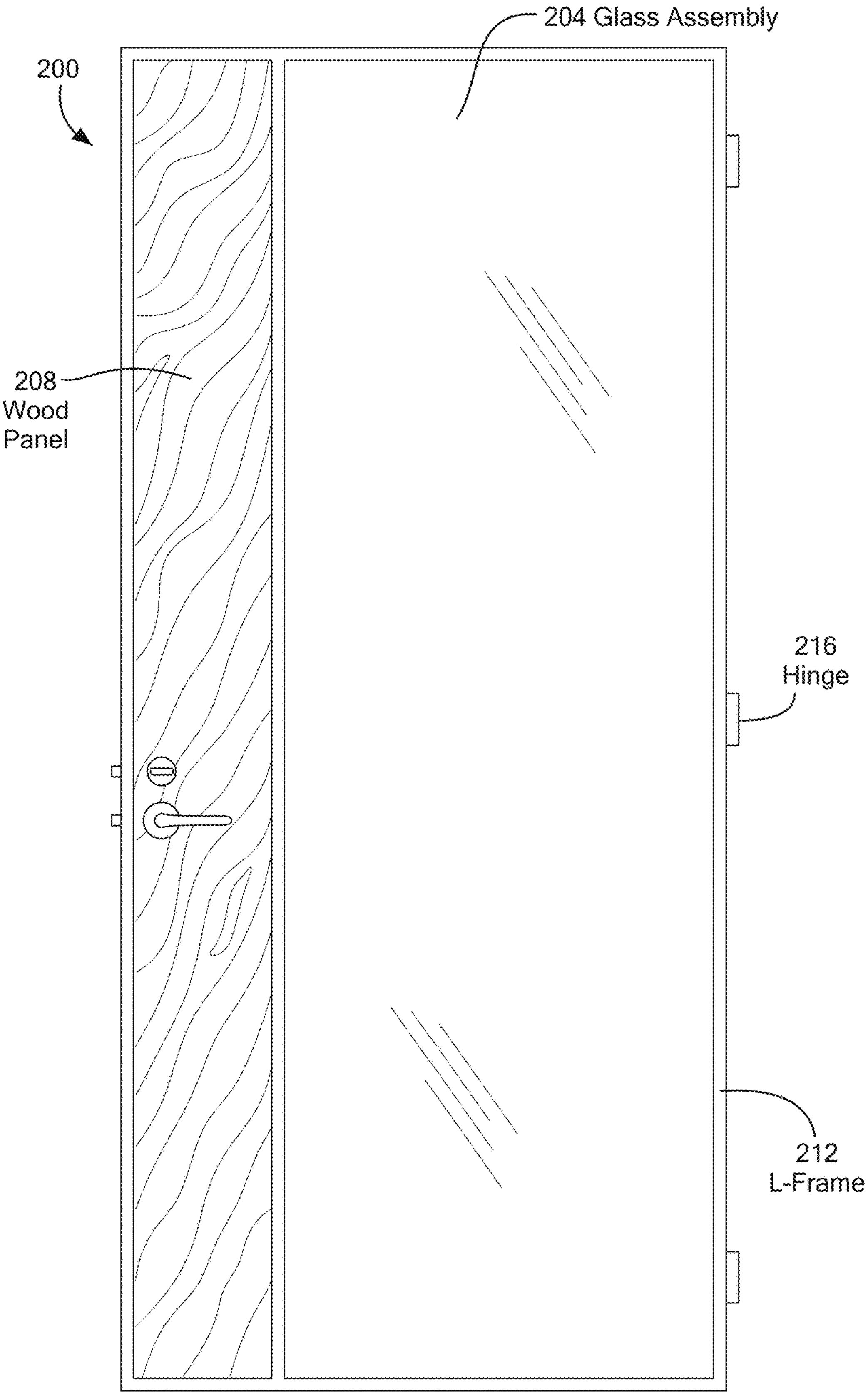
FIG. 2A schematically shows a view of the interior face of zero sight line door in accordance with illustrative embodiments of the invention.

FIG. 2A schematically shows a view of the interior face of a zero sight line door 200 in accordance with illustrative embodiments of the invention. An L-frame 212 is visible around the outside of a glass assembly 204 and a wood panel 208. In one embodiment, the L-frame 212 may have a width of ¾". Three hinges 216 are shown along the left side of the L-frame 212, which may be either internally or externally mounted. The wood panel 208 may include various cutouts for a door handle (door handle hole), one or more door locks (door lock hole), and door latching features. In one embodiment, the wood panel 208 is laterally coplanar with and has a same height and depth (i.e., thickness), as the glass assembly 204. In one embodiment, the wood panel 208 and L-frame side 212 may not be provided with holes or routing for door hardware and an installer drills/routs holes and channels as part of the door installation process.

Figure 2B:
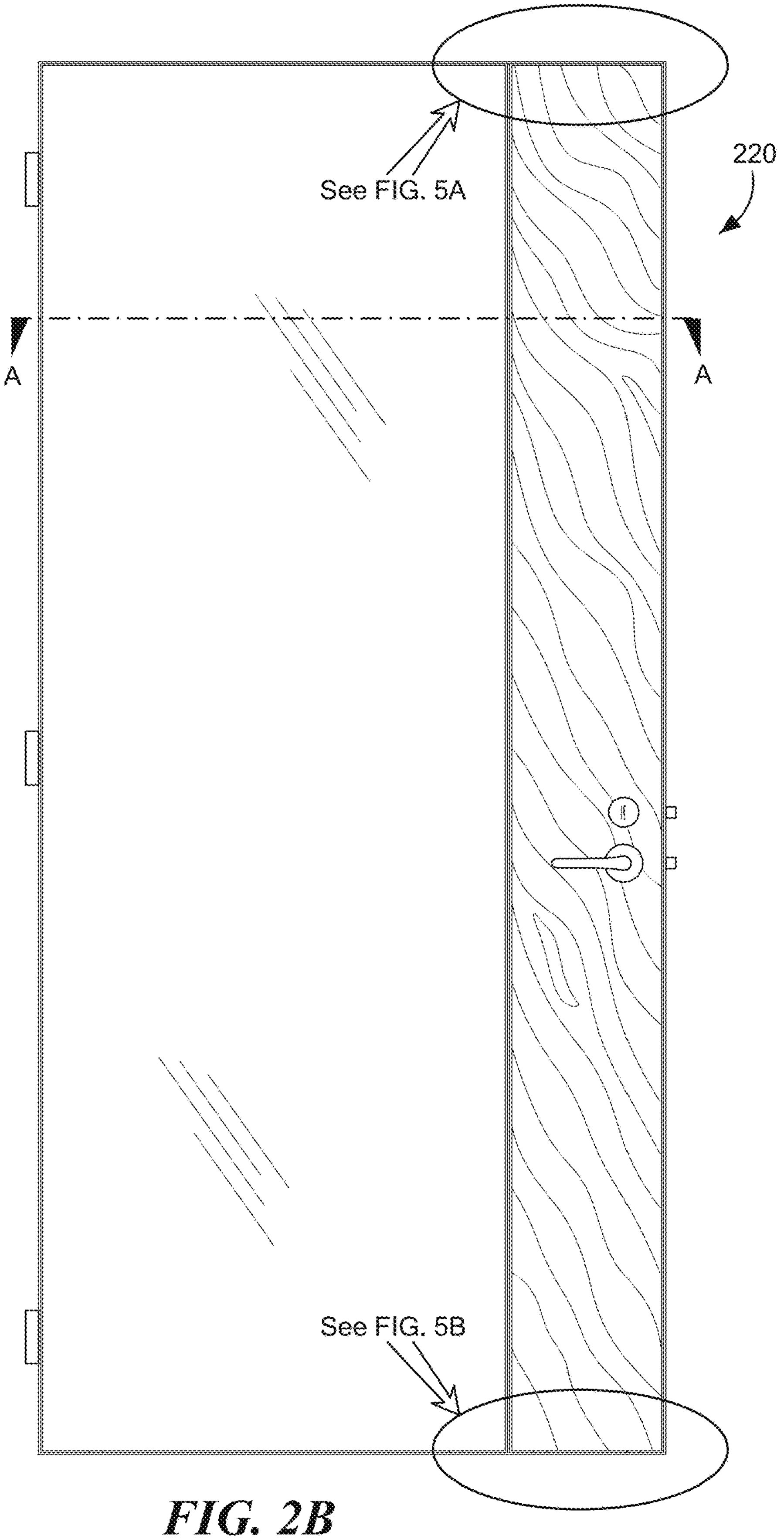
FIG. 2B schematically shows an exterior view of a zero sight line door in accordance with illustrative embodiments of the invention.

FIG. 2B schematically shows an exterior view of a zero sight line door 220 in accordance with illustrative embodiments of the invention. FIG. 2B is similar to FIG. 2A but illustrates a much narrower exposure of the L-frame 212 on the outside than the inside. An edge of the L-frame 212 is visible outside the glass assembly 204 and the wood panel 208, with a narrow gap around all sides. FIG. 2B illustrates an upper corner detail in FIG. 5A and a lower corner detail in FIG. 5B. Section A-A references the cutaway views shown in FIGS. 3A-3D.

Figure 3A:
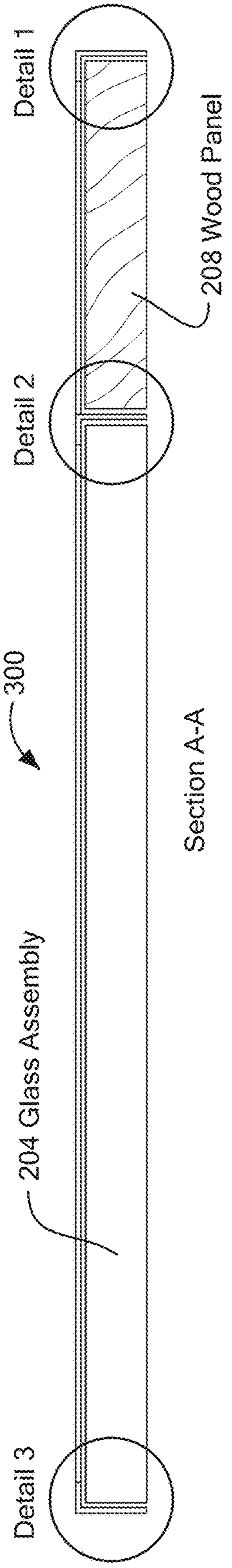
FIG. 3A schematically shows a top cutaway view of the zero sight line door in accordance with illustrative embodiments of the invention.

FIG. 3A schematically shows a top cutaway view of the zero sight line door 300 in accordance with illustrative embodiments of the invention. The top view illustrates the overall relationship between the L-Frame 212, the wood panel 208, and the glass assembly 204.

Figure 3B:
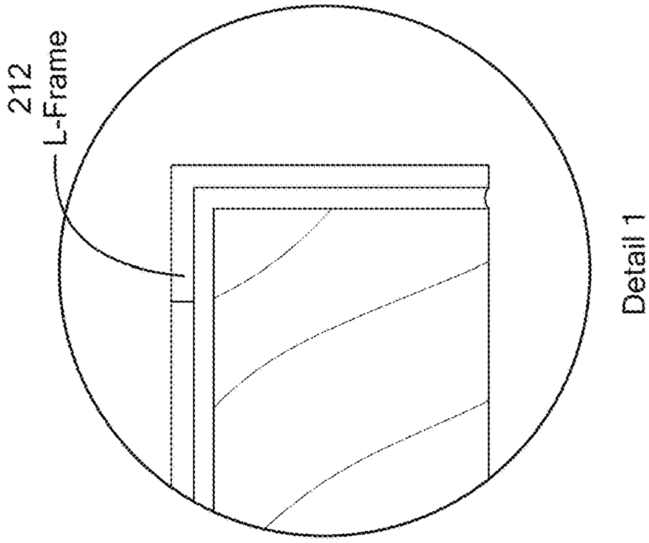
FIG. 3B schematically shows a detail view of a top right cutaway view of the zero sight line door in accordance with illustrative embodiments of the invention.

FIG. 3B schematically shows a detail view of a top right cutaway view of the zero sight line door in accordance with illustrative embodiments of the invention. The top right cutaway view is based on Detail 1 from FIG. 3A 300. The L-frame 212 partially masks outside edges of the wood panel 208. A gap between the L-frame 212 and the glass assembly 204 or wood panel 208 includes various components that add strength to the door 100 and protection from weather elements. Only a single thickness of frame material is visible from the building exterior.

Figure 3C:
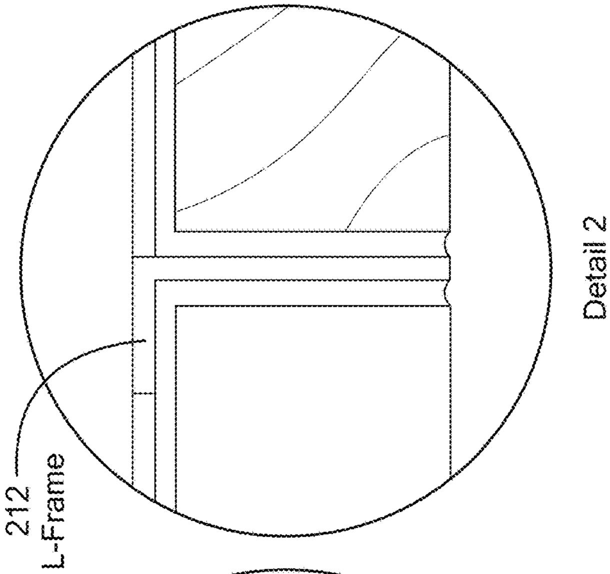
FIG. 3C schematically shows a detail view of a top center cutaway view of the zero sight line door in accordance with illustrative embodiments of the invention.

FIG. 3C schematically shows a detail view of a top center cutaway view of the zero sight line door in accordance with illustrative embodiments of the invention. The top center cutaway view is based on Detail 2 from FIG. 3A 300. The L-frame 212 provides mounting surfaces for the wood panel 208 and the glass assembly 204 and separation between them. Note that at the intersection between the wood panel 208 and the glass assembly 204, the edge of the glass assembly 204 rather than the wood panel 208 is seated within the L-Frame 212. This beneficially provides the same degree of frame exposure as the outside edges of the door 100, with only a single thickness of frame material visible from the building exterior.

Figure 3D:
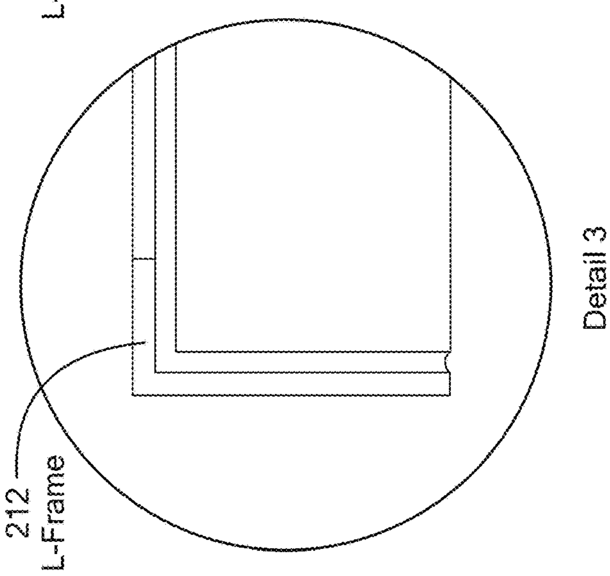
FIG. 3D schematically shows a detail view of a top left cutaway view of the zero sight line door in accordance with illustrative embodiments of the invention.

FIG. 3D schematically shows a detail view of a top left cutaway view of the zero sight line door in accordance with illustrative embodiments of the invention. The top left cutaway view is based on Detail 3 from FIG. 3A 300. Only a single thickness of frame material is visible from the building exterior.

Figure 4:
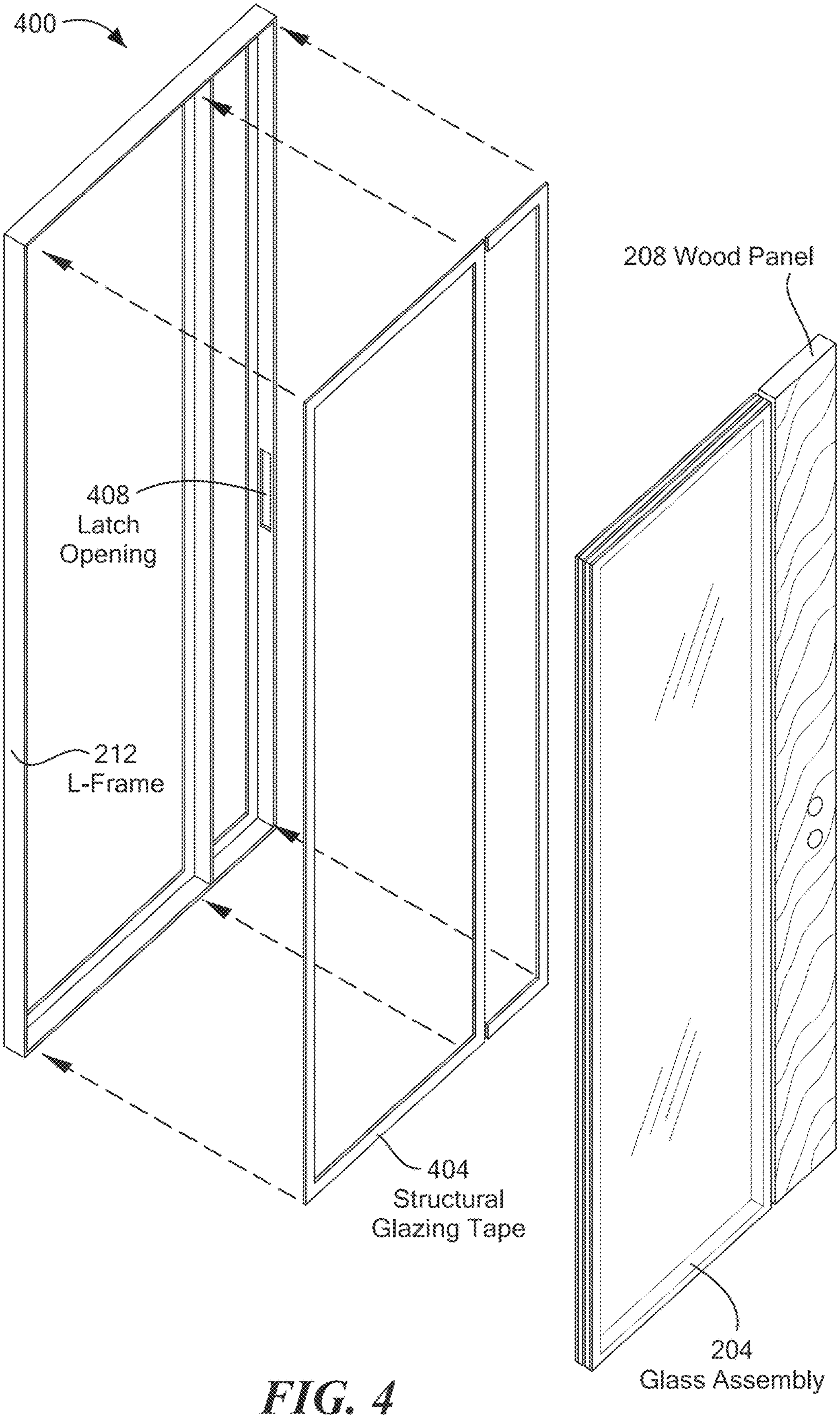
FIG. 4 schematically shows an isometric exploded view of a zero sight line door in accordance with illustrative embodiments of the invention.

FIG. 4 schematically shows an isometric exploded view of a zero sight line door 400 in accordance with illustrative embodiments of the invention. FIG. 4 is illustrated from an exterior perspective, with the L-frame 212 on the right, structural glazing tape 404 in the middle, and the glass assembly 204 and wood panel 208 on the left.

The L-frame 212 may be constructed from a single L-shaped (in cross section) member formed from carbon fiber, fiberglass, or other strong material having good insulating properties and low thermal conduction. It may also be formed from steel or aluminum, but metallic structures are less desirable because of thermal transmission from outside of the building to inside the building (i.e., heat during hot weather and cold during cold weather). The thickness of the sides of the "L" depend on the weight of the glass assembly 204 and the wood panel 208. Internal or external hinges 216 may be affixed to a pivoting side of the L-frame 212, and an opposite latching side of the L-frame 212 may have one or more cutouts (i.e., latch opening 408) to allow latches or lock bars to engage striker plates or holes in the door frame. In one embodiment, the L-frame 212 may have a single rectangular cutout for all latches or lock bars. In another embodiment, the L-frame 212 may include customized cutouts for every such protrusion.

Structural glazing tape 404 is applied to surfaces of the "L" that face the interior-facing sides of the glass assembly 204 and wood panel 208 and provide structural support and a moisture barrier. Structural glazing tape 404 is a two-sided pressure sensitive acrylic foam tape for the bonding of glass panels into curtain walls, commercial window and door systems, and skylight/canopy systems. These tapes 404 offer significant benefits, including immediate handling strength to reduce assembly time versus wet glazing, less than 5% adhesive waste factor, no space requirements for curing of glazed units, and no 2-part pumps or equipment maintenance.

Structural glazing tape 404 is applied to an inside corner of the "L" and extends toward the end of the interior-facing leg 608 of the "L" (e.g., less than ¾" for an L-frame 212 having an interior-facing leg 608 of ¾"). The L-frame 212 may have a lateral leg 604 of 1¾" that faces the sides of the glass assembly 204 and wood panel 208). The interior-facing leg 608 and lateral leg 604 are described in more detail with respect to FIG. 6. However, other dimensions for either leg of the L-frame 212 (and the structural glazing tape 404) may be used. The structural glazing tape 404 may be approximately ⅛" thick, although other thicknesses may be used without deviating from the invention.

The glass assembly 204 is an overlaid assembly including two or more layers of identically sized glass lites. Each glass lite may be on the order of ⅛" thick. The glass assembly 204 includes at least an inner lite and an outer lite. It may include one or more center lites as well. Spacing bars 624 along the periphery of each pair of layers maintain consistent spacing while providing a seal and often including a dessicant or other form of moisture-reducing or absorbing material. In a preferred embodiment, the structural glazing tape 404 installed to the L-frame 212 overlaps the spacing bars 624 when the glass assembly 204 is laid within the L-frame 212 on top of the structural glazing tape 404. Argon or other inert gas 628 may be within pairs of glass layers to reduce fogging and condensation.

The wood panel 208 is preferably a single wood piece but may include any number of wood pieces. Wood is generally preferable over other materials due to insulating qualities, low cost, and ease of fabrication and installation. Although exotic hardwoods may be used, more cost effective pine or other wood species may also be used. The wood panel 208 has a similar thickness to the glass assembly 204 and both are preferably flush with the lateral leg 604 of the L-frame 212 when installed. Other components are required and discussed herein.

Figure 5A:
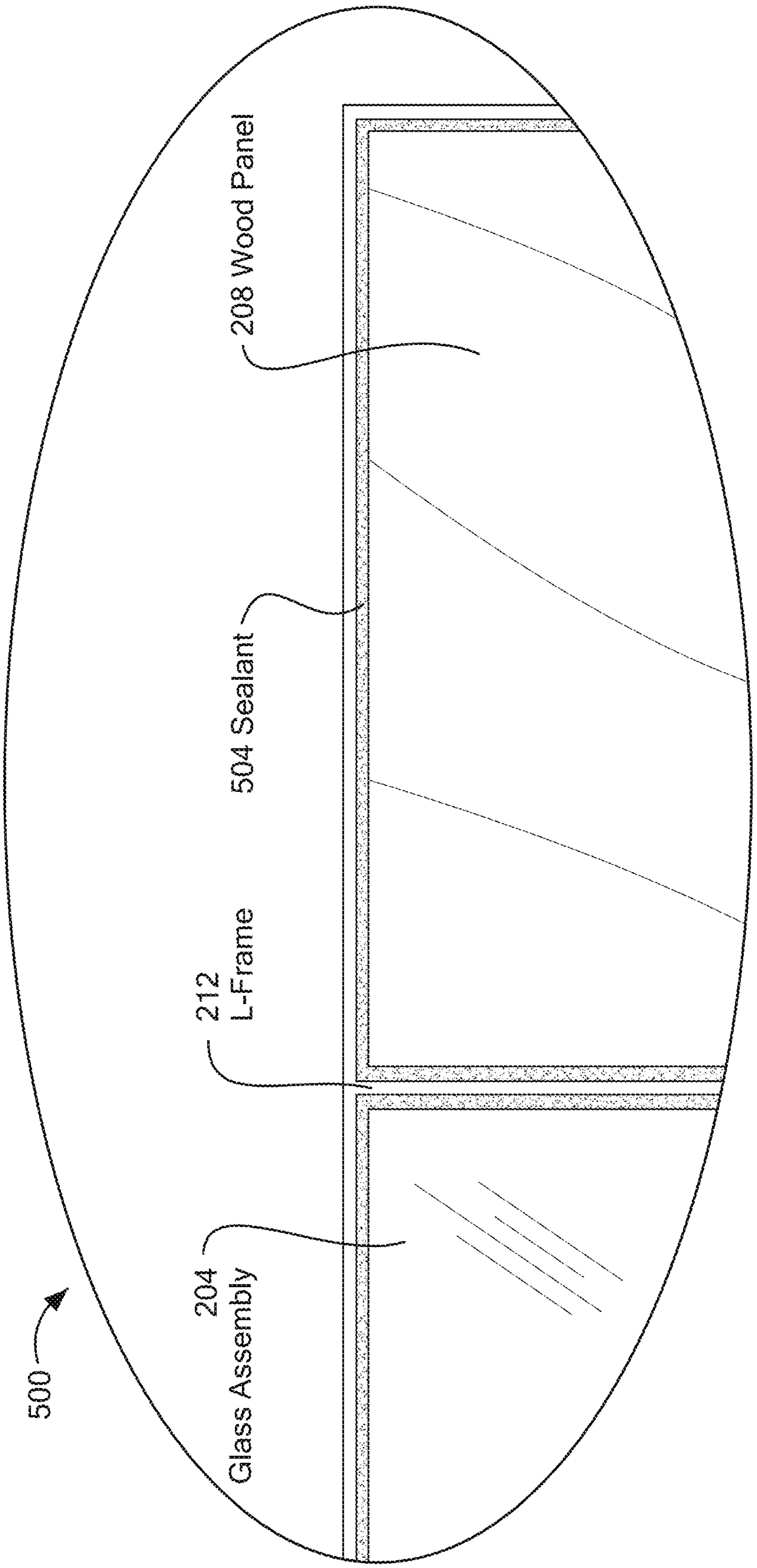
FIG. 5A schematically shows an exterior top detail view of a zero sight line door in accordance with illustrative embodiments of the invention.

FIG. 5A schematically shows an exterior top detail view of a zero sight line door 500 in accordance with illustrative embodiments of the invention. As viewed from the inside, an edge of the L-frame 212 is outside the glass assembly 204, and an evenly spaced gap between the L-frame 212 and the glass assembly 204 is filled with a suitable weather-resistant sealant or caulking compound.

Figure 5B:
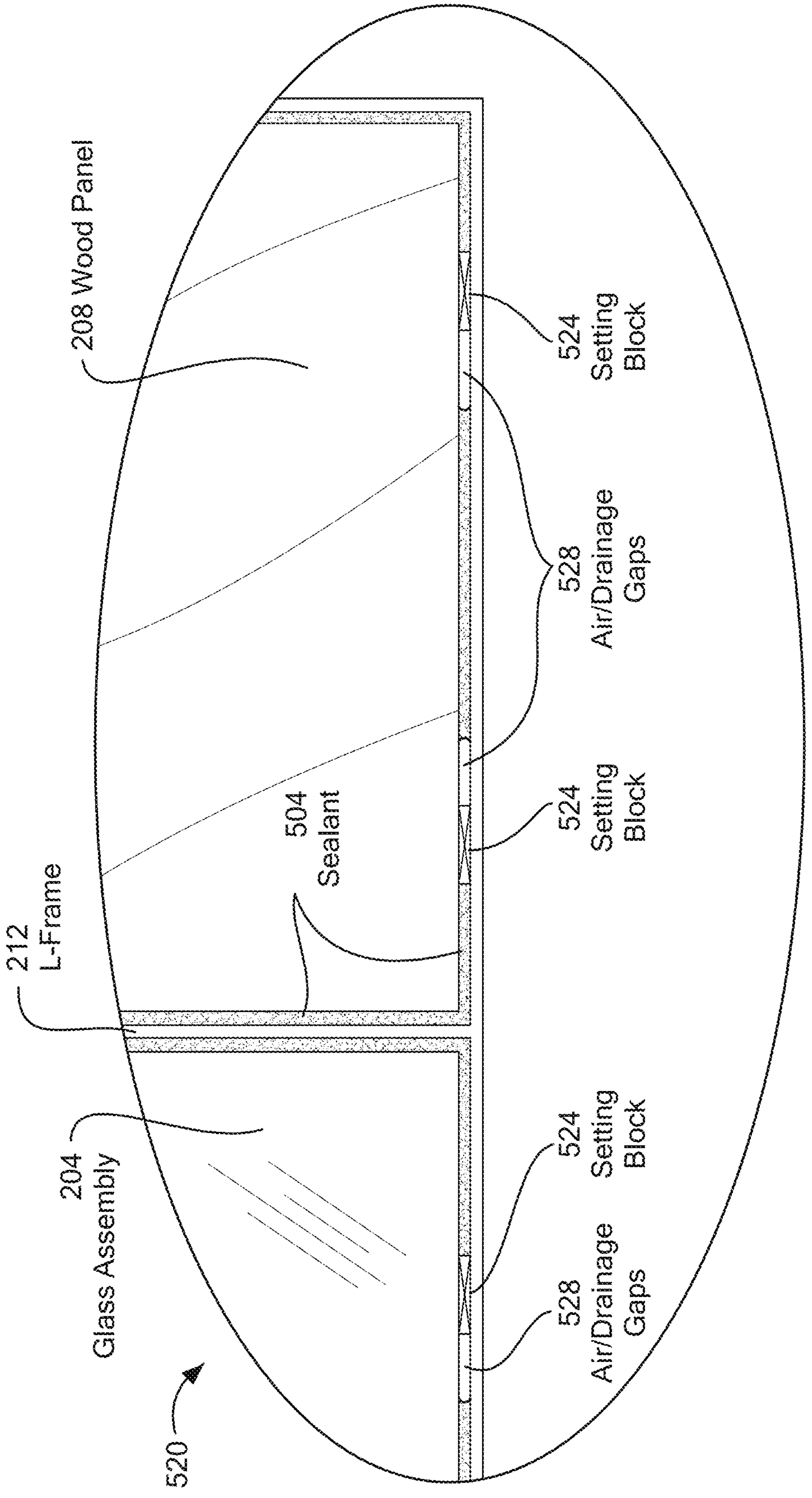
FIG. 5B schematically shows an exterior bottom detail view of a zero sight line door in accordance with illustrative embodiments of the invention.

FIG. 5B schematically shows an exterior bottom detail view of a zero sight line door 520 in accordance with illustrative embodiments of the invention. FIG. 5B shows a pair of setting blocks 524 supporting the wood panel 208 within the L-frame 212 and one of two setting blocks 524 that support the glass assembly 204. The setting blocks 524 carry the weight of the glass assembly 204 and the wood panel 208 and provide a consistent spacing relative to the L-frame 212. Dimensions of the settling blocks 524 may be determined by building codes. In one embodiment, the setting blocks 524 may be ½" wide, ⅛" high, and a same depth as the glass assembly 204. An edge of the L-frame 212 is visible outside the glass assembly 204, and an evenly spaced gap between the L-frame 212 and the glass assembly 204 is filled with a suitable weather-resistant sealant or caulking compound. A pair of air/drainage gaps 528 (as required by building codes) provide voids in the sealant to help prevent or limit glass condensation or fogging. In one embodiment, the air/drainage gaps 528 may be ½" wide or as required by building codes.

Figure 6:
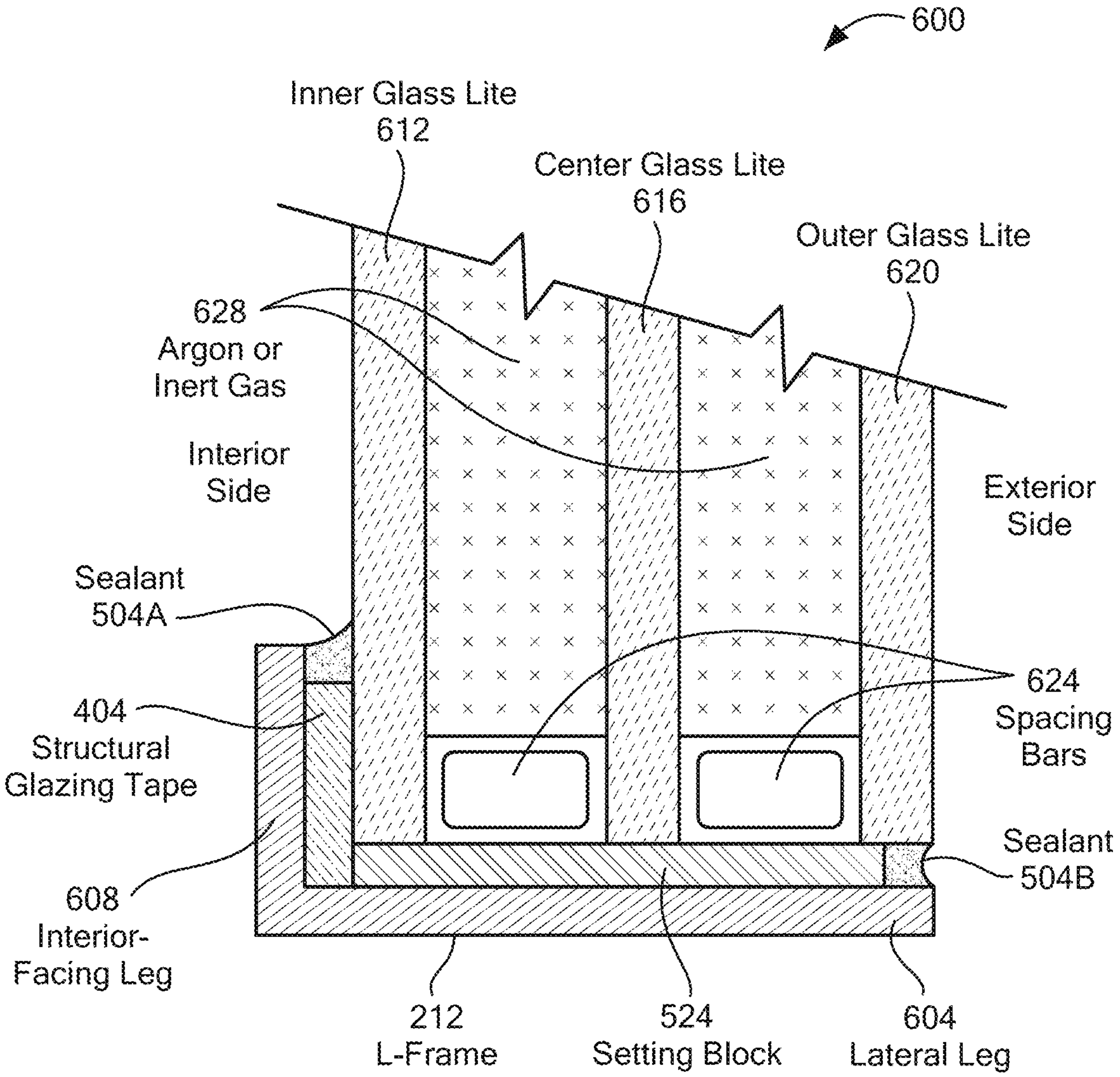
FIG. 6 schematically shows a bottom side section detail view of a zero sight line door or window in accordance with illustrative embodiments of the invention.

FIG. 6 schematically shows a bottom side sectional view of a zero sight line door or window 600 in accordance with illustrative embodiments of the invention. This figure illustrates key positional relationships between the L-frame 212, the structural glazing tape 404, the glass assembly 204, the spacing bars 624, and the setting blocks 524.

The L-frame 212 supports the other components, with a lateral leg 604 reflecting the thickness of the door or window. For example, in the case of an exterior door, the lateral leg 604 may be 1¾". An interior-facing leg 608 of the L-frame 212 projects upward at the inward-facing side of the door or window.

One side of the structural glazing tape 404 is attached to the inside surface of the interior-facing leg 608 of the L-frame 212 at the intersection (corner) with the lateral leg 604 and extending upward. The other side of the structural glazing tape 404 is affixed to the inner surface of the glass assembly 204.

The setting blocks 524 are installed between the top of the lateral leg 604 of the L-frame 212 and the bottom of the glass assembly 204. The setting blocks 524 support the weight of the glass assembly 204 and the wood panel 208, and the number, size, and location of the setting blocks 524 is selected for the application. In one embodiment, the setting blocks 524 may have a depth (left-to-right in FIG. 6) equal to a total thickness of the glass assembly 204.

The glass assembly 204 may include 2 or more identically sized glass lites (panes) that are overlaid and separated by spacing bars 624. In the illustrated embodiment, the glass assembly 204 includes glass lites identified as inner glass lite 612, center glass lite 616, and outer glass lite 620. In one embodiment, each of the glass lites 612, 616, 620 may be ⅛" thick and the thickness of the glass assembly 204 may be 1.5". The glass lites 612, 616, 620 may be tempered glass or laminated glass for strength and may include UV treatments to limit UV light within the building. The spacing bars 624 are installed around the periphery and between each pair of adjacent glass lites 612, 616, 620 and maintain consistent spacing and attachment to the glass lites. The spacing bars 624 may also include a seal and a dessicant to absorb moisture to limit condensation. The area between each pair of glass lights 612, 616, 620 may include argon or other inert gas 628 to limit moisture in the air.

The top of the L-frame 212 and glass assembly 204 is similar to that shown in FIG. 6, but the setting blocks 524 are not required. The structural glazing tape 404 holds the glass assembly 204 to the L-frame 212. Sealant 504A is applied between the end of the interior-facing leg 608 of the L-frame 212 and the glass assembly 204. Sealant 504B is also applied between the end of the lateral leg 604 of the L-frame 212 and the glass assembly 204.

FIG. 6 illustrates a key advantage of the present invention: a minimal external view of the door or window frame coupled with a reduced internal view of the frame. Viewed from the exterior (to the right of FIG. 6), only the edge of the lateral leg 604 (i.e., thickness of the lateral leg 632) of the L-frame 212 is visible and exposed to the elements. Viewed from the interior (to the left of FIG. 6), only the height of the interior-facing leg 608 of the L-frame 212 is visible. Although the interior-facing leg 608 is shown extending well above the spacing bars 624, in some embodiments the interior-facing leg 608 may extend toward an interior portion or center of the glass assembly 204 a same distance as the spacing bars 624.

Figure 7:
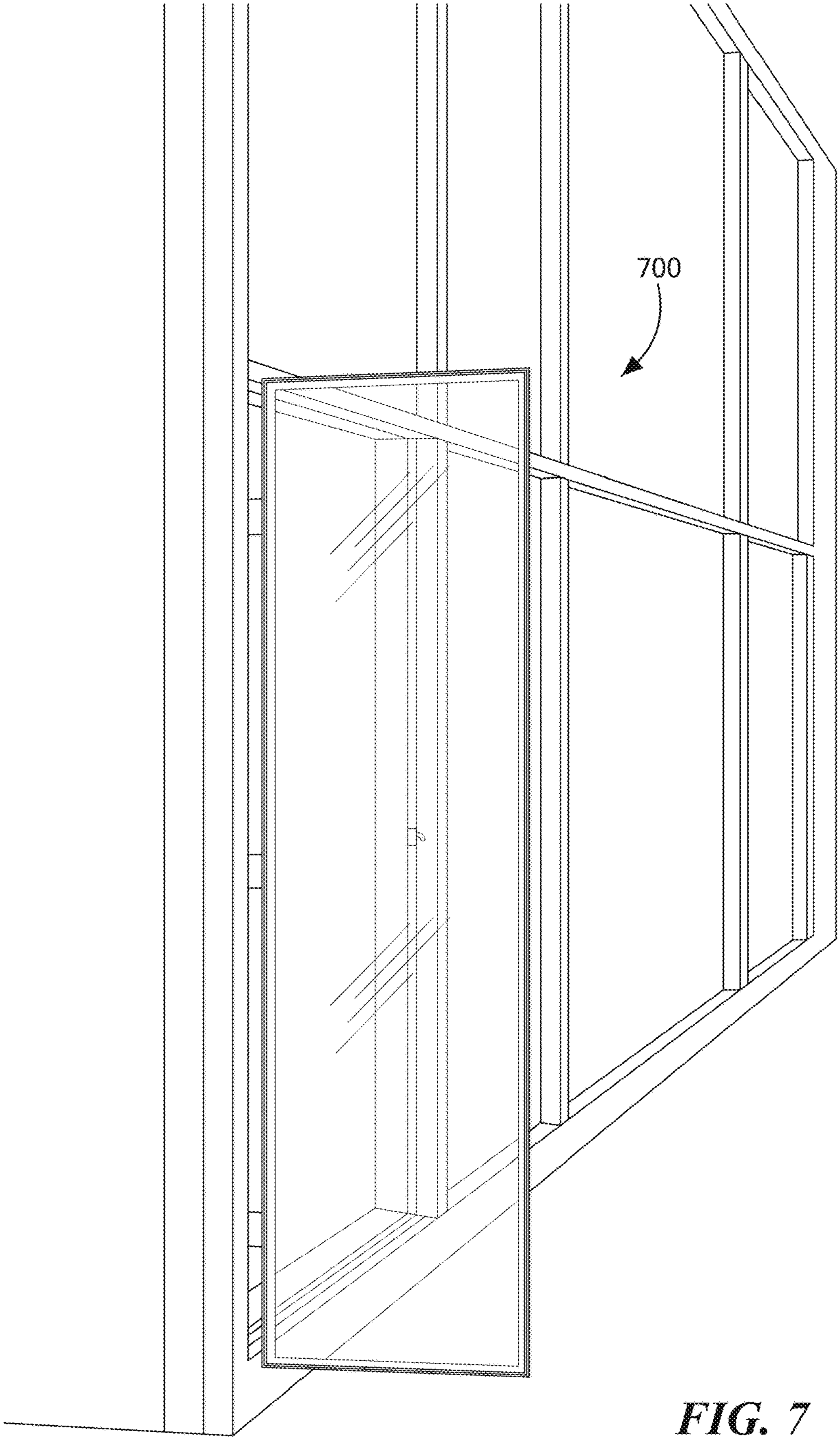
FIG. 7 schematically shows an exterior view of an open zero sight line window in accordance with illustrative embodiments of the invention.

FIG. 7 schematically shows an exterior view of an open zero sight line window 700 in accordance with illustrative embodiments of the invention. A building may include a number of zero sight line windows 700, which may be fixed windows 700, opening windows 700, or a mix of fixed and opening windows 700.

Zero sight line windows 700 have a similar structure to the glass portion of a zero sight line door 100 and do not require the wood panel for mounting door handle, locking, and latching hardware.

Figure 8A:
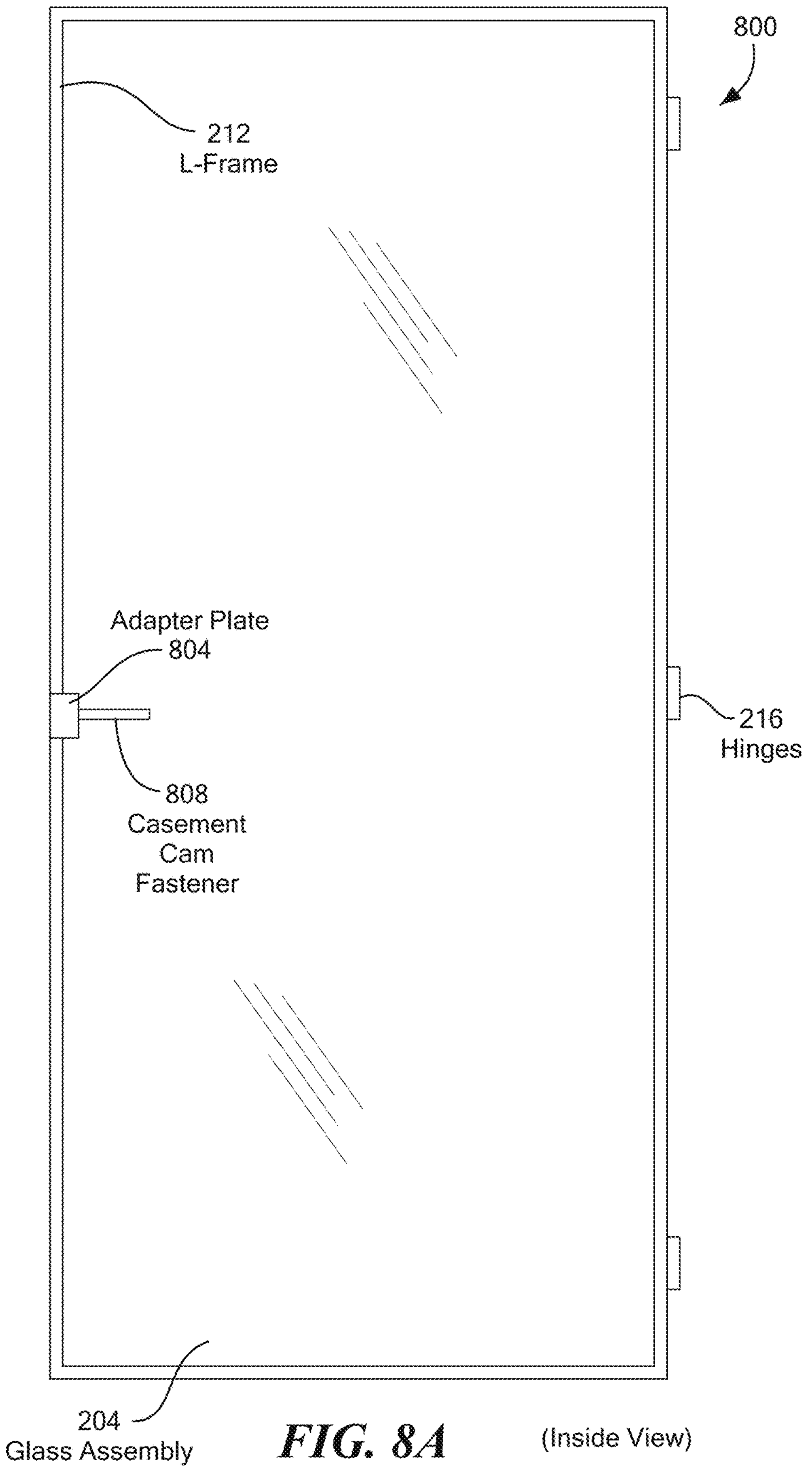
FIG. 8A schematically shows an interior view of a zero sight line window in accordance with illustrative embodiments of the invention.

FIG. 8A schematically shows an interior view of a zero sight line window 800 in accordance with illustrative embodiments of the invention. The zero sight line window 800 includes an L-frame 212 around the inner periphery of a glass assembly 204. Similar to the zero sight line door 100, the interior view 800 presents a side view of the interior-facing leg 608 of the L-frame 212.

To latch the zero sight line window 800, an adapter plate 804 is attached to the L-frame 212 and a casement cam fastener 808 is attached to the adapter plate 804. This allows a user within the building to close and secure the zero sight line window 800 to the window jamb.

FIG. 8B schematically shows an exterior view of a zero sight line window 820 in accordance with illustrative embodiments of the invention. The glass assembly 204 is evenly spaced within the L-frame 212 such that a gap is present to accommodate setting blocks 524 (not shown), structural glazing tape 404 (not shown), and sealant 504 (not shown), as discussed and shown in FIGS. 5A, 5B, and 6. Similar to the zero sight line door 100, the exterior view 820 presents an end-on view of the lateral leg 604 (i.e., thickness of the lateral leg 632) of the L-frame 212. When closed, the zero sight line window 800 presents a clean and virtually non-interrupted window surface, with only the material thickness of the lateral leg 604 visible from the outside.

Figure 9:
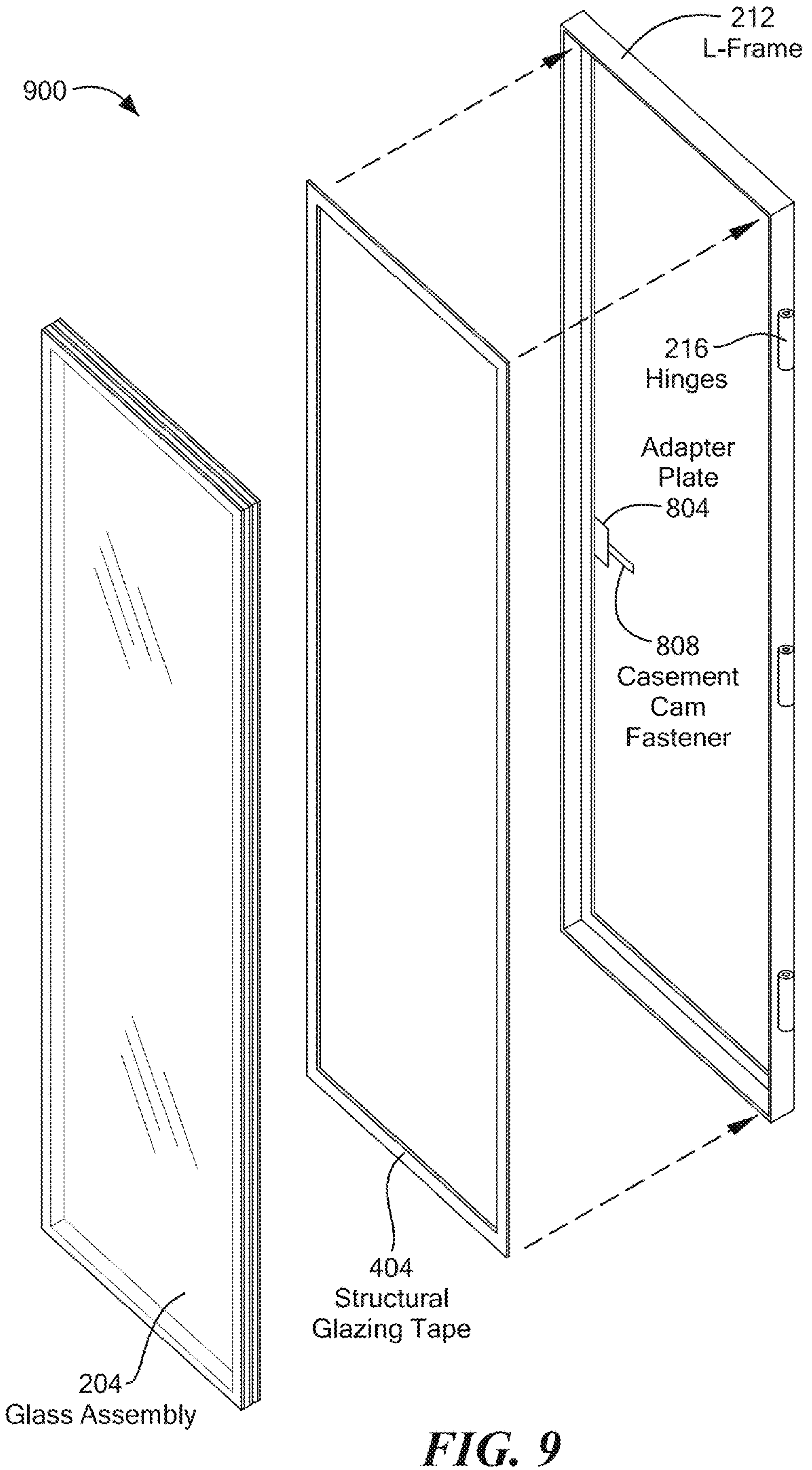
FIG. 9 schematically shows an isometric exploded view of a zero sight line window in accordance with illustrative embodiments of the invention.

FIG. 9 schematically shows an isometric exploded view of a zero sight line window 900 in accordance with illustrative embodiments of the invention. FIG. 9 is illustrated from an exterior perspective, with the L-frame 212 on the right, structural glazing tape 404 in the middle, and the glass assembly 204 on the left.

The L-frame 212 may be constructed from a single L-shaped (in cross section) member formed from carbon fiber, fiberglass, or other similar material. It may also be formed from steel or aluminum, but metallic structures are less desirable because of thermal transmission from outside of the building to inside the building (i.e., heat during hot weather and cold during cold weather). The thickness of the sides of the "L" depend on the weight of the glass assembly 204. Internal or external hinges 216 may be affixed to a pivoting side of the L-frame 212. Unlike the door L-frame 212 of FIG. 4, the window L-frame 212 does not include an intermediate vertical L-frame divider between the glass assembly 204 and the wood panel 208 because the wood panel 208 is not present.

Structural glazing tape 404 is applied to surfaces of the "L" that face the interior-facing sides of the glass assembly 204 (i.e. inner glass lite 612) and provide structural support and a moisture barrier. Structural glazing tape 404 is a two-sided pressure sensitive acrylic foam tape for the bonding of glass panels into curtain walls, commercial window and door systems, and skylight/canopy systems. These tapes 404 offer significant benefits, including immediate handling strength to reduce assembly time versus wet glazing, less than 5% adhesive waste factor, no space requirements for curing of glazed units, and no 2-part pumps or equipment maintenance.

Structural glazing tape 404 is applied to an inside corner of the "L" and extends toward the end of the interior-facing leg 608 of the "L" (e.g., less than ¾" for an L-frame 212 having an interior-facing leg 608 of ¾"). The L-frame 212 may have a lateral leg 604 of 1¾" or other thickness that faces the sides of the glass assembly 204. The interior-facing leg 608 and lateral leg 604 are described in more detail with respect to FIG. 6. However, other dimensions for either leg of the L-frame 212 (and the structural glazing tape 404) may be used. The structural glazing tape 404 may be approximately ⅛" thick, although other thicknesses may be used without deviating from the invention.

The glass assembly 204 is an overlaid assembly including two or more layers of identically sized glass lites. Each glass lite may be on the order of ⅛" thick. The glass assembly 204 includes at least an outer lite 620 and an inner lite 612. It may include one or more center lites 616 as well. Spacing bars 624 along the periphery of each pair of layers maintain consistent spacing while providing a seal and often including a dessicant or other form of moisture-reducing or absorbing material. In one embodiment, the structural glazing tape 404 installed to the L-frame 412 may overlap the spacing bars 624 when the glass assembly 204 is laid within the L-frame 212 on top of the structural glazing tape 404. Argon or other inert gas 628 may be within pairs of glass layers to reduce fogging and condensation.

Figure 10:
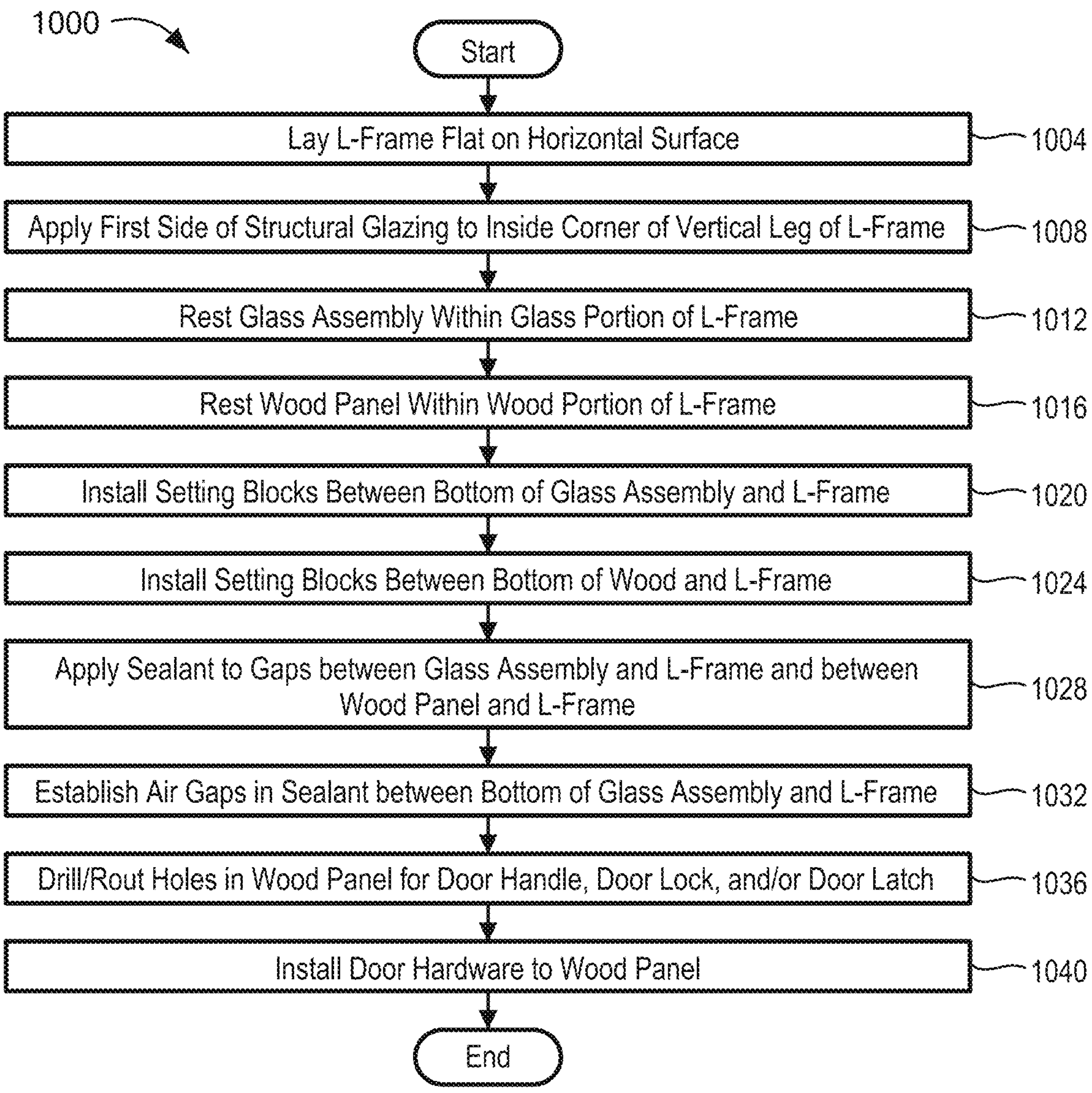
FIG. 10 shows a flowchart illustrating a zero sight line door assembly process in accordance with illustrative embodiments of the invention.

FIG. 10 shows a flowchart illustrating a zero sight line door assembly process 1000 in accordance with illustrative embodiments of the invention. The process shown in FIG. 10 assumes the L-Frame 212 and the glass assembly 204 are pre-fabricated by other means, as would be expected in building construction. The described process could be performed at a custom door factory or possibly in the field at the building location. Additionally, wood panel 208 finishing, such as sanding, filling, drilling, routing, staining, and painting/coating could either be performed at a custom door factory or the building location. However, it would undoubtedly be preferable to receive a completely finished wood panel 208 at the building site such that only wood panel 208 mounting and door hardware installation would be required. Building sites commonly have significant dust levels in the air and traffic that may negatively affect wood panel 208 finishing quality. Flow begins at block 1004.

At block 1004, the L-frame 212 is laid flat on a horizontal surface. Preferably, the horizontal surface is flat, at least a same length and width as the L-frame 212, able to support the weight of a completely assembled door 100, and free of dust or dirt. The interior-facing leg 608 of the L-frame 212 faces downward and the lateral leg 604 of the L-frame 212 faces outward (i.e., away from the center of the L-frame 212). Flow proceeds to block 1008.

At block 1008, a first side of structural glazing tape 404 is applied to inside surfaces of the interior-facing leg 608. The structural glazing tape 404 may have peelable first and second sides covering adhesive, and the first peelable side is removed. One edge of the structural glazing tape 404 is in the inside corner of the L-frame 212 and contacts the inside surface of the lateral leg 604. The other edge of the structural glazing tape extends toward the free end of the interior-facing leg 608. Flow proceeds to block 1012.

At block 1012, the second side of the structural glazing tape 404 within a glass portion of the L-frame 212 is peeled to expose adhesive and the glass assembly 204 is rested on the second side of the structural glazing tape 404 within the glass portion of the L-frame 212. The weight of the glass assembly 204 will bond the glass assembly 204 to the structural glazing tape 404. Flow proceeds to block 1016.

At block 1016, the second side of the structural glazing tape 404 within a wood portion of the L-frame 212 is peeled to expose adhesive and the wood panel 208 is rested on the second side of the structural glazing tape 404 within the wood portion of the L-frame 212. The weight of the wood panel 208 will bond the wood panel 208 to the structural glazing tape 404. Flow proceeds to block 1020.

At block 1020, setting blocks 524 are installed between the bottom of the glass assembly 204 (from the point of view of an installed door 100) and the L-frame 212. Flow proceeds to block 1024.

At block 1024, setting blocks 524 are installed between the bottom of the wood panel 208 (from the point of view of an installed door 100) and the L-frame 212. Flow proceeds to block 1028.

At block 1028, sealant 504A and 504B is applied to gaps between the glass assembly 204 and the L-frame 212 and between the wood panel 208 and the L-frame 212. Flow proceeds to block 1032.

At block 1032, air/drainage gaps 528 are established in the sealant 504B at the lateral leg 604 of the L-frame 212. The number and width of the gaps 528 may be subject to building codes or other practices. Flow proceeds to block 1036.

At block 1036, if necessary, holes are drilled/routed to the wood panel 208 for a door handle, a door lock, and/or a door latch. This step may not be necessary if the holes were previously drilled/routed (i.e., prior to assembly). This step may also include various finishing steps associated with the wood portion, including sanding, patching, staining, sealing, painting, etc. Flow proceeds to block 1040.

At block 1040, door hardware is installed to the wood panel 208, as required. Flow ends at block 1040. At this point, the zero sight line door 100 may be installed to a door frame with hinges 216.

Figure 11:
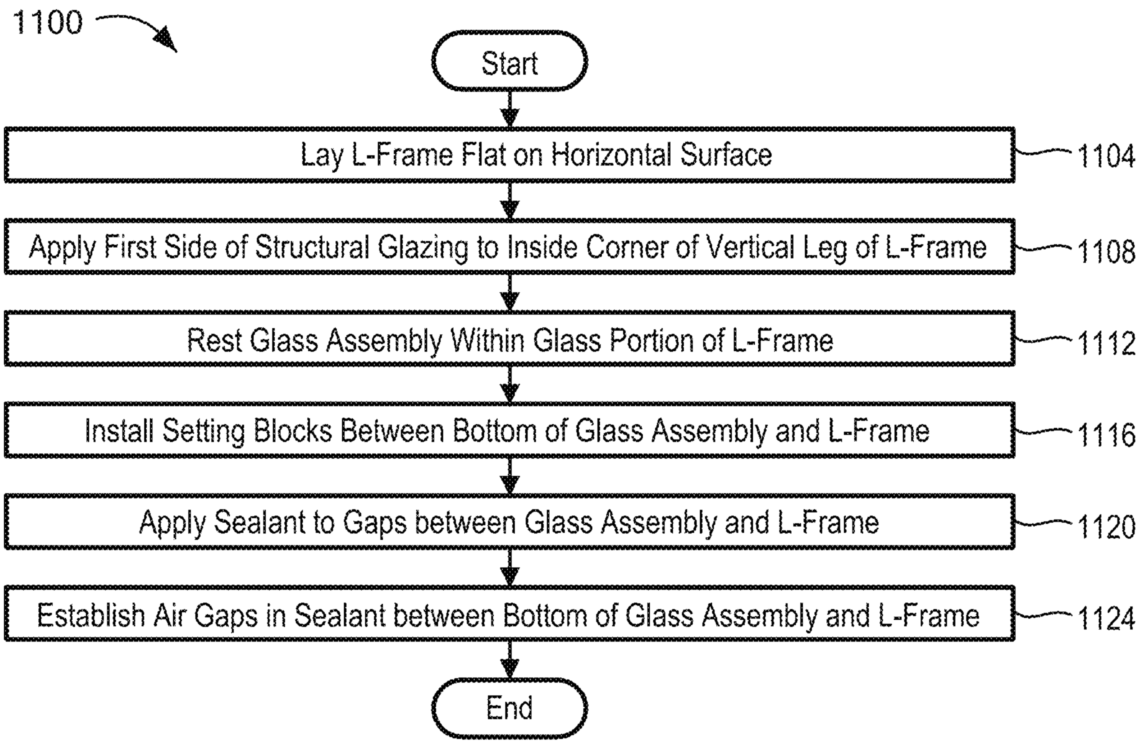
FIG. 11 shows a flowchart illustrating a zero sight line window assembly process in accordance with illustrative embodiments of the invention.

FIG. 11 shows a flowchart illustrating a zero sight line window assembly process 1100 in accordance with illustrative embodiments of the invention. The process shown in FIG. 11 assumes the L-Frame 212 and the glass assembly 204 are pre-fabricated by other means, as would be expected in building construction. The described process could be performed at a custom window factory or possibly in the field at the building location. Flow begins at block 1104.

At block 1104, the L-frame 212 is laid flat on a horizontal surface. Preferably, the horizontal surface is flat, at least a same length and width as the L-frame 212, able to support the weight of a completely assembled window 700, and free of dust or dirt. The interior-facing leg 608 of the L-frame 212 faces downward and the lateral leg 604 of the L-frame 212 faces outward (i.e., away from the interior portion or center of the L-frame 212). Flow proceeds to block 1108.

At block 1108, a first side of structural glazing tape 404 is applied to inside surfaces of the interior-facing leg 608. The structural glazing tape 404 may have peelable first and second sides covering adhesive, and the first peelable side is removed. One edge of the structural glazing tape 404 is in the inside corner of the L-frame 212 and contacts the inside surface of the lateral leg 604. The other edge of the structural glazing tape extends toward the free end of the interior-facing leg 608. Flow proceeds to block 1112.

At block 1112, the second side of the structural glazing tape 404 within the L-frame 212 is peeled to expose adhesive and the glass assembly 204 is rested on the second side of the structural glazing tape 404 within the L-frame 212. The weight of the glass assembly 204 will bond the glass assembly 204 to the structural glazing tape 404. Flow proceeds to block 1116.

At block 1116, setting blocks 524 are installed between the bottom of the glass assembly 204 (from the point of view of an installed window 700) and the L-frame 212. Flow proceeds to block 1120.

At block 1120, sealant 504A and 504B is applied to gaps between the glass assembly 204 and the L-frame 212. Flow proceeds to block 1124.

At block 1124, air/drainage gaps 528 are established in the sealant 504B at the lateral leg 604 of the L-frame 212. The number and width of the gaps 528 may be subject to building codes or other practices. In one embodiment, the adapter plate 804 and casement cam fastener 808 may have been pre-installed to the L-frame 212. In another embodiment, the adapter plate 804 and casement cam fastener 808 may be installed at this step. Flow ends at block 1124. At this point, the zero sight line window 700 may be installed to a window frame with hinges 216.

Various embodiments of the invention have been described in fulfillment of the various objectives of the invention. It should be recognized that these embodiments are merely illustrative of the principles of the present invention. Numerous modifications and adaptions thereof will be readily apparent to those skilled in the art without departing from the spirit and scope of the present invention as defined in the following claims.

What is claimed is:

1. A door for a building exterior, the door comprising:
   - a glass assembly having a height and a depth and a plurality of glass lateral edges;
   - a wood panel, at least a portion of the wood panel being laterally coplanar with and having a same height and depth as the glass assembly, the wood panel having a plurality of wood lateral edges; and
   - a frame that surrounds the glass lateral edges and the wood lateral edges, the frame comprising:
     - an interior-facing leg, configured to extend from one of the plurality of lateral edges toward an interior portion of the glass assembly; and a lateral leg, substantially orthogonally extending from an edge of the interior-facing leg and facing the lateral edges of the glass assembly and the wood panel, the lateral leg having a lateral leg thickness, the frame, wood panel and glass assembly configured so that when the door is mounted to a building, the lateral leg thickness is the only visible part of the frame when viewed from the building exterior.

2. The door of claim 1, further comprising:

structural glazing tape having inner and outer sides, wherein the inner side of the structural glazing tape is affixed to an outer side of the interior-facing leg and the outer side of the structural glazing tape is affixed to an inner side of the glass assembly.

3. The door of claim 1, wherein the glass assembly comprises a parallel plurality of glass layers, wherein each pair of adjacent glass layers are separated by a spacing bar at a periphery of each pair of adjacent glass layers.

4. The door of claim 3, wherein one or more of the plurality of glass layers is tempered glass or laminated glass.

5. The door of claim 1, further comprising:

weatherproof sealant between the frame and the glass assembly and the frame and the wood panel, configured to seal the door from moisture incursion.

6. The door of claim 5, wherein the weatherproof sealant includes a plurality of voids between a bottom of the glass assembly and a top of a lateral leg at a bottom of the frame.

7. The door of claim 6, further comprising:

a plurality of setting blocks between the bottom of the glass assembly and the top of the lateral leg at the bottom of the frame, wherein the plurality of setting blocks has a setting block height, wherein a thickness of the weatherproof sealant is equal to the setting block height.

8. The door of claim 1, wherein the frame is a non-metallic material.

9. A window for a building exterior, the window comprising:

a glass assembly having a plurality of glass lites and lateral edges, adjacent glass lites of the plurality of glass lites separated by spacing bars at a periphery of the glass assembly;

a frame that surrounds the glass lateral edges, the frame comprising:

an interior-facing leg, configured to extend from one of the plurality of glass lateral edges toward an interior portion of the glass assembly; and a lateral leg, substantially orthogonally extending from an edge of the interior-facing leg and facing the lateral edges of the glass assembly, the lateral leg having a lateral leg thickness; and structural glazing tape having inner and outer sides, the inner side of the structural glazing tape is affixed to an outer side of the interior-facing leg at an intersection of the interior-facing and lateral legs and the outer side of the structural glazing tape is affixed to an inner side of the glass assembly, the structural glazing tape configured to completely overlap the spacing bars and terminate prior to a free end of the interior facing leg, the frame and the glass assembly configured so that when the window is mounted to a building, the lateral leg thickness is the only visible part of the frame when viewed from the building exterior.

10. The window of claim 9, wherein the glass assembly comprises a parallel plurality of glass lites, wherein each pair of adjacent glass lites are separated by a spacing bar at a periphery of each pair of adjacent glass lites.

11. The window of claim 10, wherein one or more of the plurality of glass lites is tempered glass or laminated glass.

12. The window of claim 9, further comprising:

weatherproof sealant between the frame and the glass assembly, configured to seal the window from moisture incursion.

13. The window of claim 12, wherein the weatherproof sealant includes a plurality of voids between a bottom of the glass assembly and a top of a lateral leg at a bottom of the frame.

14. The window of claim 9, further comprising:

a plurality of setting blocks between the bottom of the glass assembly and the top of the lateral leg at the bottom of the frame, wherein the plurality of setting blocks has a setting block height, wherein a thickness of the weatherproof sealant is equal to the setting block height.

15. The window of claim 9, wherein the frame is a non-metallic material.

16. A method for assembling a door or window, the method comprising:

laying a frame having an L-shaped cross section, a top, and a bottom opposite the top on a horizontal surface, the frame comprising a first leg having a first leg surface in contact with the horizontal surface and a second leg having a second leg thickness substantially orthogonally extending upward from an outside edge of the first leg, the first leg surface being intended to face a building interior and the second leg thickness being intended to face outwardly from a building exterior when the door or window is mounted;

applying a first side of a structural glazing tape to the first leg, the structural glazing tape being in contact with an intersection of the first and second legs;

resting a glass assembly having a top and a bottom within the frame onto a second side of the structural glazing tape such that gaps between sides of the glass assembly and the second leg are the same, the glass assembly having a plurality of layers separated by spacing bars between edges of adjacent layers, the structural glazing tape configured to completely overlap the spacing bars and terminate prior to a free end of the first leg;

installing a plurality of setting blocks between the bottom of the frame and the bottom of the glass assembly;

applying a sealant in gaps between the first leg and a surface of the glass assembly facing the first leg, and the second leg and lateral edges of the glass assembly.

17. The method of claim 16, further comprising:

bonding, by the structural glazing tape, the frame to the glass assembly.

18. The method of claim 16, further comprising:

resting a wood panel within the frame onto the second side of the structural glazing tape such that gaps between sides of the wood panel and the second leg are the same, wherein the wood panel is coplanar with the glass assembly and inside edges of the wood panel and the glass assembly are parallel, wherein a portion of the frame separates the inside edges of the wood panel from the glass assembly.

19. The method of claim 16, wherein the frame is a non-metallic material.

* * * * *